United States Patent Office 3,346,470
Patented Oct. 10, 1967

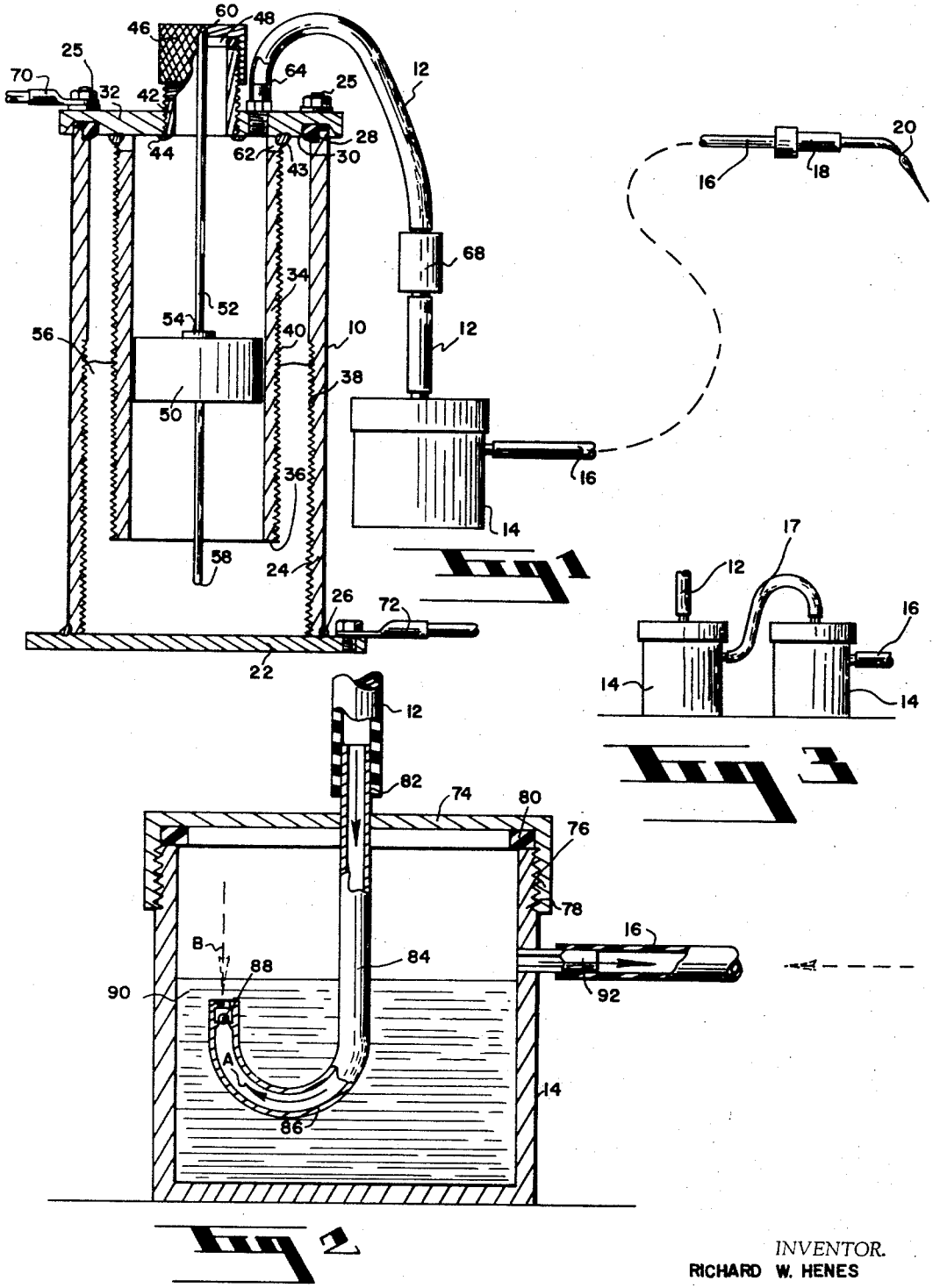

3,346,470
MEANS AND METHOD FOR PRODUCING A HYDROGEN AND OXYGEN TORCH FUEL GAS HAVING A VAPOROUS FLUX HOMOGENEOUSLY MIXED THEREIN
Richard W. Henes, Phoenix, Ariz., assignor to Henes Manufacturing Co., Phoenix, Ariz., a corporation of Arizona
Filed Dec. 24, 1963, Ser. No. 333,093
5 Claims. (Cl. 204—129)

This invention relates to a means and method for producing a hydrogen and oxygen fuel gas having a vaporous flux homogeneously mixed therein.

In the art of brazing and other similar metal fusion techniques, it has been found necessary to efficiently clean surfaces of metals in order to effect an efficient fusion of such metals together.

As for example, in the art of brazing, surface oxides and other material on various metals may create gaseous action within molten brass or copper alloys during a brazing operation, and thereby cause bubbling of the molten material or may cause voids in the area of fusion of the metals together. Additionally, there is foreign material or impurities on the surface of a metal which prevent brass or various copper alloys from flowing over the surface of metal and becoming fused thereto. Consequently, it is highly desirable to efficiently clean the metal surfaces to be brazed together immediately before or during the brazing operation.

Borax is a very common flux or cleaning agent normally used in the area of metal surfaces in order to clean them under elevated temperatures and during a time when a fusable alloy is being applied thereto.

It has been found that entrainment of a vaporous brazing flux may be emitted in the area of a torch flame efficiently to clean metals during various brazing operations, all of which promotes efficiency and economy of material and labor in various brazing and fusing processes.

It has been a problem to provide a torch fuel having a very homogeneous mixture of oxygen, a combustible fuel, and a vaporous flux.

In prior art devices and methods, the mixture of a flux with acetylene has been known, and this mixture has been combined with oxygen very nearly at the point of combustion.

Accordingly, it is an object of the present invention to provide a means and method for producing a hydrogen and oxygen torch fuel gas having a vaporous flux homogeneously mixed therein, wherein a mixture of electrolytically produced hydrogen and oxygen is passed through a volatile solution containing fluxing material so that the fluxing material in a vaporous state is very intimately and homogeneously mixed with the hydrogen and oxygen mixture.

Another object of the invention is to provide a method of producing a hydrogen and oxygen torch fuel gas having a vaporous flux homogeneously mixed therein, and wherein a solvent for the flux is also capable of absorbing water entrained initially in a mixture of electrolytically produced hydrogen and oxygen gas so that during entrainment of vaporous flux or volatile flux in the hydrogen and oxygen gas mixture that water is removed to purify the hydrogen and oxygen gas mixture having an entrained flux therein.

Another object of the invention is to provide a method for producing hydrogen and oxygen torch fuel gas having a vaporous flux mixed therein, wherein an alcoholic solvent is used to dissolve a borax or other similar flux whereby a vaporous content of the alcoholic vehicle and the flux in the mixture of hydrogen and oxygen gas serves a dual function of admitting flux in the gas flame of a torch, and also the entrained alcoholic content of the solvent therein acts to absorb oxygen, or combine with oxygen, around the flame area and to reduce oxidation of the metals being brazed or fused by operation of a torch flame.

Another object of the invention is to provide a means and method for producing a hydrogen and oxygen torch fuel gas having a vaporous flux homogeneously mixed therein, wherein an alcoholic solvent serves three different purposes, namely, as a solvent for producing a vaporous flux, as a water collector for a mixture of hydrogen and oxygen gas, and as an oxygen reducing agent delivered in a torch fuel gas at the point of a flame to prevent atmospheric oxygen from combining with the work under the torch flame.

Further objects and advantages of the invention may be apparent from the following specification, appended claims and accompanying drawings in which:

FIGURE 1 is a side elevational view of a means for producing a homogeneously mixed hydrogen and oxygen fuel gas and entrained flux for torches in accordance with the precent invention, and showing structure of an electrolytic gas generator and flux tank in section to amplify the illustration;

FIGURE 2 is an enlarged sectional view of a drying tank in accordance with the invention wherein a flow of hydrogen and oxygen gases may be passed through a fluxing agent or solution in said tank before the gases reach a torch for combustion; and FIGURE 3 is a side elevational view of a pair of gas drying and fluxing tanks in series respectively.

Referring to FIGURE 1 of the drawings, it will be seen that the invention comprises an electrolytic gas generator 10 having a hydrogen and oxygen gas delivery conduit 12 which delivers gas into a flux tank 14 from which the gases pass through a flexible conduit 16 to a torch 18 provided with a gas emitting tip 20.

Referring to FIGURE 1 of the drawings, it will be seen that the generator is provided with a base plate 22 to which is welded an upstanding hollow cylindrical generator casing 24 which serves as a reactor cathode for electrolytic production of hydrogen, as will be hereinafter described. This casing 24 is preferably made of steel pipe or tubing, and is peripherally welded at 26 to the base plate 22.

The upper annular edge of the casing 24 is engaged with a sealing gasket 28 held in a groove 30 of a cover 32 to the lower side of which is welded a hollow tubular reactor anode 34. This anode 34 is preferably made of steel pipe or tubing and is suspended concentrically in the outer casing 24 and provided with a lower end 36 spaced from the upper surface of the base plate 22, all as shown best in FIGURE 1 of the drawings.

The casing 24 is provided with an internally threaded wall 38. Conventional screw threading of this wall 38 provides extended surface area thereof for a large volume production of hydrogen in proportion to the overall external dimensions of the casing 24.

It will be understood that the extended surface area of the internal wall 38 of the casing 24 may be provided by other means than the screw threads, as for example, inwardly directed fins, or the like. The annular consrtuction of the casing 24 is very readily provided with an internal screw thread, which is the simplest manner of extending the cathode surface area of the generator.

The reactor anode 34 is provided with external annular screw threads 40 to extend the surface area of the anode for the production of a maximum amount of oxygen in proportion to the size of the generator.

It will be obvious to those skilled in the art that since the reactor anode 34 is annular that external annular fins may be provided in lieu of the screw threads hereinbefore described.

The upper end of the tubular anode structure 34 is welded at 43 to the cover 32 and the gasket 30 acts to insulate the cover 32 from the cathode casing 24, as will be hereinafter described, the cover 32 is clamped to the cathode casing 24 by electrically insulated bolts 25.

Concentrically of the cover 32 is a filler neck 42 of hollow cylindrical construction which is peripherally welded at 44 in a central opening in the cover 32.

A cap 46 is screw threaded on the neck 42 and is provided with a gasket 48 forming a sealing engagement of the cap 46 with the upper end of the filler neck 42.

Disposed concentrically and internally of the hollow cylindrical anode 34 is a float 50 preferably made of styrofoam or any other suitable material which will float on electrolytes in the generator.

The float 50 is mounted on a rod 52 having a shoulder 54 thereon against which the float 50 moves upwardly while supported on the electrolyte 56 in a generator.

The rod 52 is provided with a lower end 58 which may engage the base plate 22 when the electrolyte 56 is at a low level. The rod 52 is also provided with an upper end 60 which may be level with the upper end of the filler neck 42 when the electrolyte 56 is at a proper level in the generator. Thus, the addition of water through the filler neck may be continued until the float 50 rises to carry the upper end 60 of the rod 52 to a position which is substantially level with the upper end of the filler neck 42. Thus, the generator is charged with the proper amount of water so that the electrolyte is at a proper concentration and capable of electrolyzing water to produce hydrogen and oxygen gases.

The cathode casing 24 at its internal screw threads 38 generates oxygen which passes upwardly as indicated by arrows in FIGURE 1 of the drawings, said oxygen being produced on an extended surface area of the threads 38 while comparable action of the anode on its external screw thread portions 40 produces hydrogen, and these gases mix above the electrolyte 56 and pass upwardly through an opening 62 in the side wall of the reactor anode adjacent the cover plate 32. Thus, the gases pass inwardly to the interior of the anode 34 and pass outwardly through a tube fitting 64 screw threaded in the cover 32.

The hereinbefore described tube 12 is coupled to the fitting 64 and this tube or conduit 12 extends to a flame flash back arrestor casing 68 having a porous stone therein through which the mixture of hydrogen and oxygen gases passes on the way to the drying casing 14 hereinbefore described.

The electrolyte 56, hereinbefore described, is a conventional electrolyte material, and may be in accordance with such electrolyte known in the prior art.

As shown in FIGURE 1, an electrical conductor 70 is connected to the cover 32, while another electrical conductor 72 is connected to the base plate 22, thus to provide a source of electrical energy, respectively connected to the anode and the cathode, hereinbefore described.

The flux tank or casing 14 is provided with a cover 74 having an internally screw threaded flange 76 which is externally screw threaded on a complemental thread 78 externally of the upper end of the tank 14. A gasket 80 is interposed between the cover 74 and the upper end of the tank 78 to provide a seal. The conduit 12 is sealed to a conduit 84 and communicates with the downwardly directed conduit portion 84 having an upwardly turned section 86 wherein a check valve 88 permits flow in a direction of an arrow A and prevents back flow in direction of a broken line arrow B. Thus this check valve 88 permits the flow of hydrogen and oxygen gases into the flux casing 14 wherein the fluxing agent 90 is disposed. This fluxing agent 90 may comprise various brazing flux materials which are soluble in an alcoholic solvent or volatile vehicle. It will be obvious to those skilled in the art that any equivalent materials may be used, and that when the hydrogen and oxygen gases are directed through a layer of this material that vaporous flux may be entrained in the hydrogen and oxygen gases.

As shown in FIGURE 3 of the drawings, a pair of the tanks 14 may be placed in series having the outlet of the first tank 14 connected by a tube 17 to the inlet of the other tank 14 so that gas may pass from the conduit 12 through the tank 14 and outwardly through the tubular conduit 17 and into the inlet of the second tank 14 and outwardly through the tube 16 to the torch 18.

The internal construction of the tanks 14 is similar to that shown in FIGURE 2 of the drawings.

The tank 14, which first receives hydrogen and oxygen gases from the tube 12, may contain any suitable drying material, such as calcium chloride monohydrate $$(CaCl_2 \cdot H_2O)$$

Thus, a chemical drying agent or other drying agent may be placed in the tank 14 receiving gases from the tube 12. Thus, gases passing through this tank 14 are dried and relieved of water, and pass through the tube 17 to the inlet of the second tank 14 wherein a fluxing material may be present. This fluxing material may be a liquid flux solution, but also may be finely powdered borax, or the like, so that dry hydrogen and oxygen gases may be bubbled through the powder to create a fine dust which may be entrained in the hydrogen and oxygen gases and carried through the conduit 16 to the torch 18.

It will be appreciated by those skilled in the art that the drying tank and the fluxing tank in series may have numerous advantages in that all of the water may be taken out of the hydrogen and oxygen gases preliminary to the application of the various types of flux to the gases so that a very dry mixture of hydrogen and oxygen with an entrained flux may be utilized as a combustion medium and fluxing medium at the torch tip 20, and in this manner the alcoholic reducing agent or volatile vehicles may not be used and the dry hydrogen and oxygen gases may operate at higher temperature, and with powdered flux entrained in the dry gases the metals being fused are protected from oxidation by the flux in fusible condition at the flame area of the torch 20.

The foregoing fluxes may include borates, chlorides, and fluorides, however common borax is preferred due to its economical advantages.

It is known that these common fluxes used in the fluxing and cleaning of fusible metals, including iron and steel, copper, silver, gold, nickel, zinc, alloys of copper, and phosphorous alloys of copper, may be fluxed or treated by the borates, including sodium, potassium, lithium, etc., fused borax, fluro borates, including potassium and sodium, fluorides, including sodium, potassium and lithium, chlorides, including sodium, potassium and lithium, acids, including boric and calcined boric, alkalies, including potassium hydroxide and sodium hydroxide, wetting agents, etc. The various uses of the foregoing materials with relation to brazing fluxes are well known, and these materials are to be included as a range of equivalents in accordance with the present invention.

It has been found that when alcoholic solvents are used with common borax in the container 14 that the borax readily goes into solution with the alcoholic solvent, such that the bubbling of hydrogen and oxygen gases through the solution 90 formed by the alcoholic vehicle and the borax causes entrainment of the borax flux with the hydrogen and oxygen gases as these gases pass outwardly through the conduit 16 to the torch 18. Entrainment of the flux vapor comprising the borax and the alcoholic vehicle efficiently mixes the alcoholic vehicle with the flux and the hydrogen and oxygen gases so that as these gases issue from the tip 20 of the torch 18, the work being brazed or fused is efficiently cleaned by cleaning action of the borax so that the metal or fused material is fully fluxed and flows evenly and smoothly and provides a good fusion with parts being brazed.

It will be appreciated that the alcoholic fluids or vehicles also have an affinity for water which may enter the casing 14 through the conduit 12, said water being normally entrained by the hydrogen and oxygen gases electrolytically produced in the generator 10. Thus, the alcoholic vehicle for the flux placed in the casing 14 absorbs water, thereby reducing the water vapor content of the gases issuing from the torch 20 and the comparable or respective evaporative cooling capacity of moisture in the gases. Further, the alcoholic vehicle contains hydrocarbons which, when they reach the area of the flame at the torch 20, are combustible with atmospheric oxygen surrounding the work, thereby acting to reduce the oxygen present at the metals being fused and consequent oxidation of such materials during the brazing process. Accordingly, it will be appreciated that the alcoholic vehicle in the tank 14 acts as a solvent for the fluxing material so that it may be entrained in the hydrogen and oxygen gas mixture. The alcoholic solvent also absorbs water from the hydrogen and oxygen gases to reduce the aqueous content of the gases at the tip 20 of the torch 18, and, further, the alcoholic vehicle with its hydrocarbon character serves as a reducing agent for oxygen in the brazing area.

It will be here noted that when the alcoholic solvent for the flux is used that it is burned by oxygen from the air at the torch flame 20, thereby consuming atmospheric oxygen and preventing undue oxidation of the parts being fused together at the torch flame.

It will be appreciated by those skilled in the art that the alcoholic vehicles, which will be hereinafter described, are particularly compatible with the hydrogen and oxygen gases which are bubbled therethrough and from sea level to approximately 3,500 feet under normal temperature and barometric conditions the vaporizing rate of the alcohol is such that a desirable amount thereof is entrained in the hydrogen and oxygen gases so that the flame at the tip of the torch 20 is provided with sufficient combustible alcohol to act as an oxygen consuming or reducing agent, and yet there is not excess of the alcohol to impair the quality of the flame for the desired brazing or fusing operations.

It is to be noted that the fluxing materials hereinbefore described are preferably proportioned to the alcoholic solvents in such a ratio that these solvents are saturated in solution with the fluxing elements hereinbefore described.

As will be hereinafter described, the various equivalents of the alcoholic vehicles may vary in compatibility with the various fluxing materials hereinbefore described.

The volatile flux vehicles in accordance with the present invention may include methyl alcohol, as well as other alcohols. These materials are volatile, have affinity for water, and act as good solvents for flux materials such as borax, as hereinbefore described.

It will be obvious to those skilled in the art that various modifications of the present invention may be resorted to in a manner limited only by a just interpretation of the following claims.

I claim:

1. A method of producing a homogeneously mixed and fluxed hydrogen and oxygen fuel gas for torches consisting of electrolytically decomposing an aqueous electrolyte and producing a mixture of hydrogen and oxygen, then passing said mixture of hydrogen and oxygen through a solution comprising an alcoholic solvent and a fluxing material in solution therewith thereby causing vaporous entrainment and mixing of said solution with said hydrogen and oxygen gases as they pass through said solution, then conducting said mixture of hydrogen and oxygen gases to a torch; and then creating combustion of the mixture to produce a high velocity high temperature flame having metal cleaning characteristics.

2. A method of producing a homogeneously mixed and fluxed hydrogen and oxygen fuel gas for torches consisting of electrolytically decomposing an aqueous electrolyte and producing a mixture of hydrogen and oxygen, then passing said mixture of hydrogen and oxygen through a solution comprising a solvent and a fluxing material dissolved therein, thereby causing vaporous entrainment and mixing of said solution with said hydrogen and oxygen gases as they are passed through said solution, then conducting said mixture of hydrogen and oxygen together with vapors of said solution to a torch; and then creating combustion of the mixture and said vapors to produce a high velocity high temperature flame having metal cleaning characteristics.

3. A method of producing a homogeneously mixed and fluxed hydrogen and oxygen fuel gas for torches consisting of electrolytically decomposing an aqueous electrolyte and producing a mixture of hydrogen and oxygen, then passing said mixture of hydrogen and oxygen through a solution comprising an alcoholic solvent and a borax fluxing agent, thereby causing vaporous entrainment and mixing of said solution with said hydrogen and oxygen gases as they are passed through said solution; then conducting said mixture of said hydrogen and oxygen together with vapors of said solution to a torch; and then creating combustion of the mixture and vapors to produce a high velocity high temperature flame having metal cleaning characteristics.

4. A method of producing a homogeneously mixed and fluxed hydrogen and oxygen fuel gas for torches consisting of electrolytically decomposing an aqueous electrolyte and producing a mixture of hydrogen and oxygen gases, then passing said mixture of hydrogen and oxygen gases through a solution comprising a vehicle having an affinity for water and having a flux dissolved therein, thereby causing vaporous entrainment and mixing of said solution with said hydrogen and oxygen gases and causing removal of water from said hydrogen and oxygen gases as they pass through said solution, then conducting said mixture of said hydrogen and oxygen and vapors of said solution to a torch; and then creating combustion of the mixture and vapors in the absence of said water to produce a relatively dry high velocity high temperature flame having metal cleaning characteristics.

5. A method of producing a homogeneously mixed and fluxed hydrogen and oxygen fuel gas for torches consisting of electrolytically decomposing an aqueous electrolyte and producing a mixture of hydrogen and oxygen; then passing said mixture of hydrogen and oxygen through a solution comprising an alcoholic solvent having an affinity for water and a fluxing material dissolved therein, thereby causing vaporous entrainment of said flux and solvent in said hydrogen and oxygen gases as they pass through said solution; then conducting said mixture of hydrogen and oxygen to a torch; and then creating combustion of the mixture to produce a high velocity high temperature flame having metal cleaning characteristics and whereby said solvent combines with atmospheric oxygen to prevent oxidation of the work adjacent the torch and whereby the affinity of said solution for water removes water entrained from said hydrogen and oxygen gases as they pass through said solution to thereby provide a dry fuel gas at the flame area of the torch so that said water does not evaporatively cool the flame area of the torch.

References Cited

UNITED STATES PATENTS

| 308,276 | 11/1884 | Paine | 204—278 X |
| 558,176 | 4/1896 | Huber | 204—278 |
| 2,622,548 | 12/1952 | Chouinard et al. | 158—27.4 |

JOHN H. MACK, *Primary Examiner.*

D. R. VALENTINE, *Assistant Examiner.*